Feb. 23, 1954  E. I. VALYI  2,669,758
MOLD FORMING MACHINE
Filed May 14, 1951  6 Sheets-Sheet 2

INVENTOR.
Emery I. Valyi
BY
Atty.

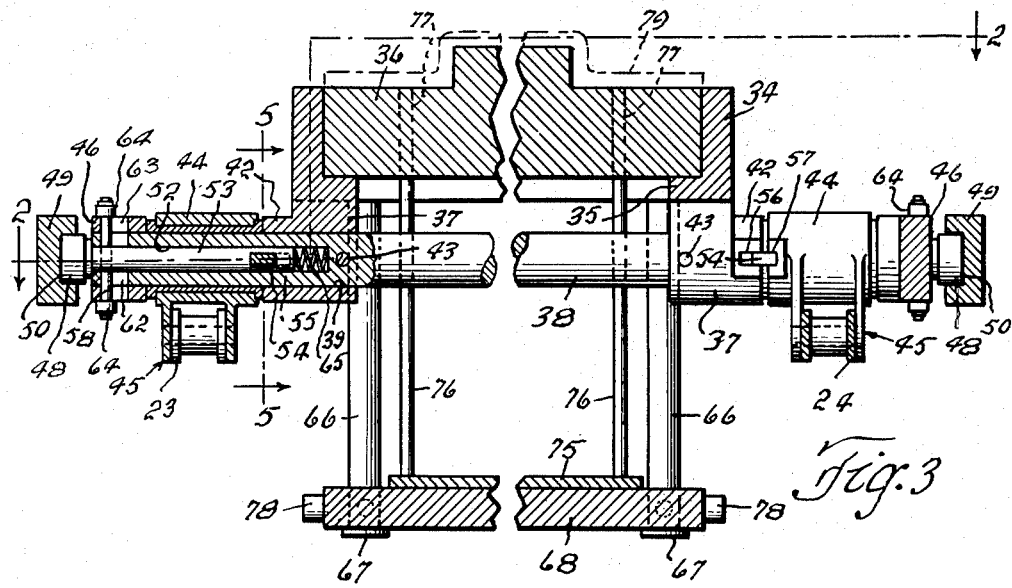
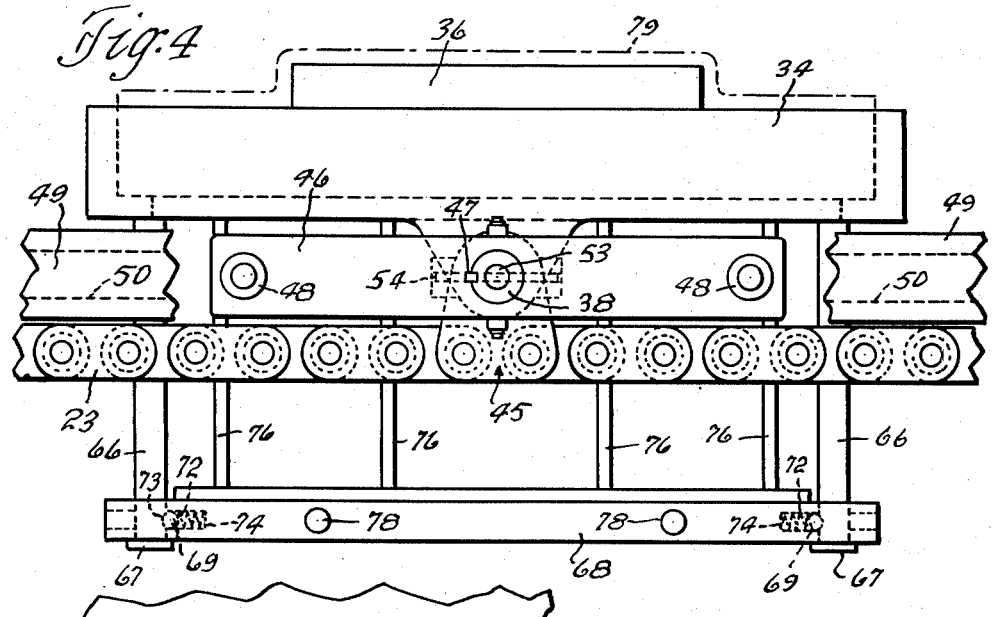

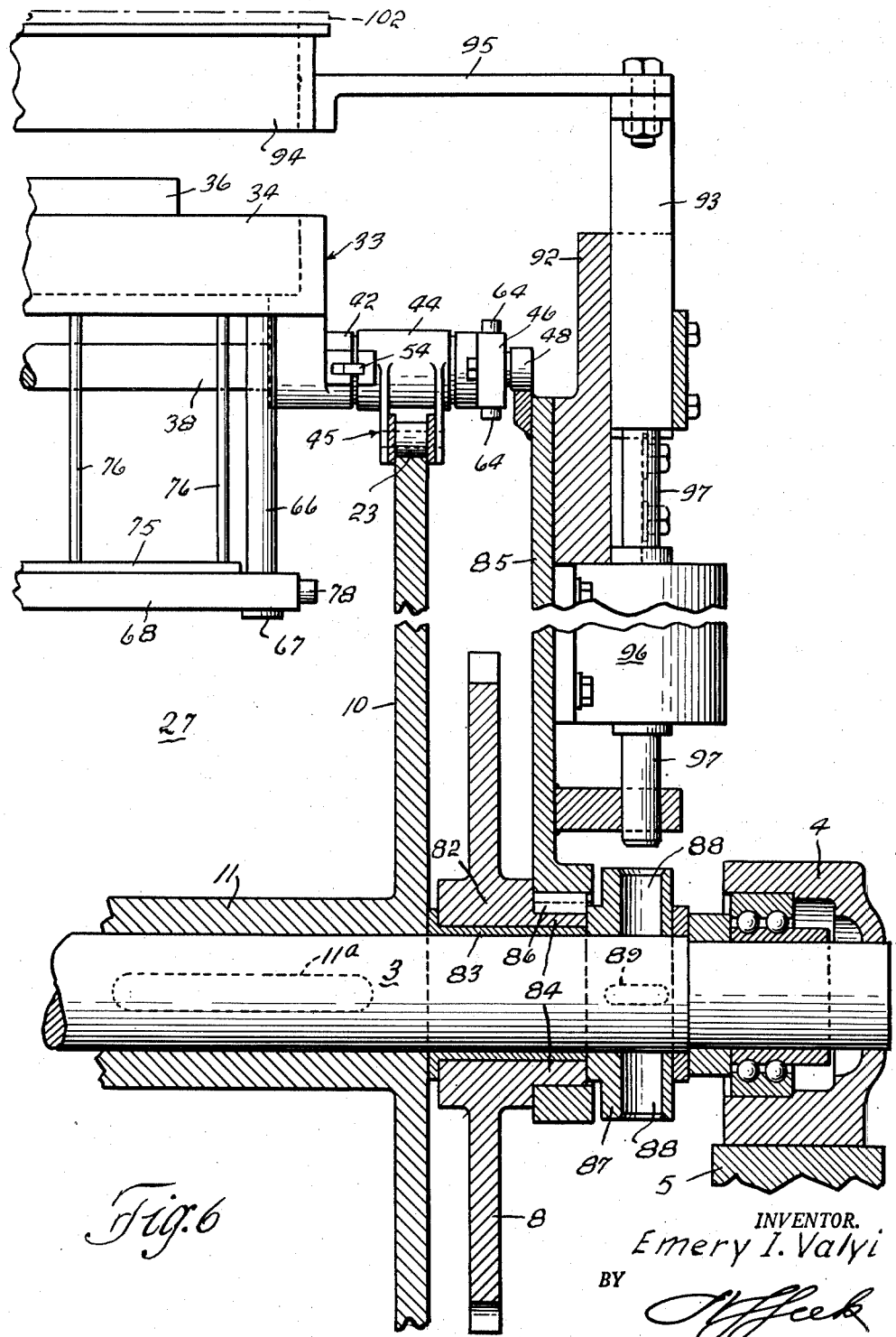

Feb. 23, 1954 E. I. VALYI 2,669,758
MOLD FORMING MACHINE
Filed May 14, 1951 6 Sheets-Sheet 5

INVENTOR.
Emery I. Valyi
BY
Atty.

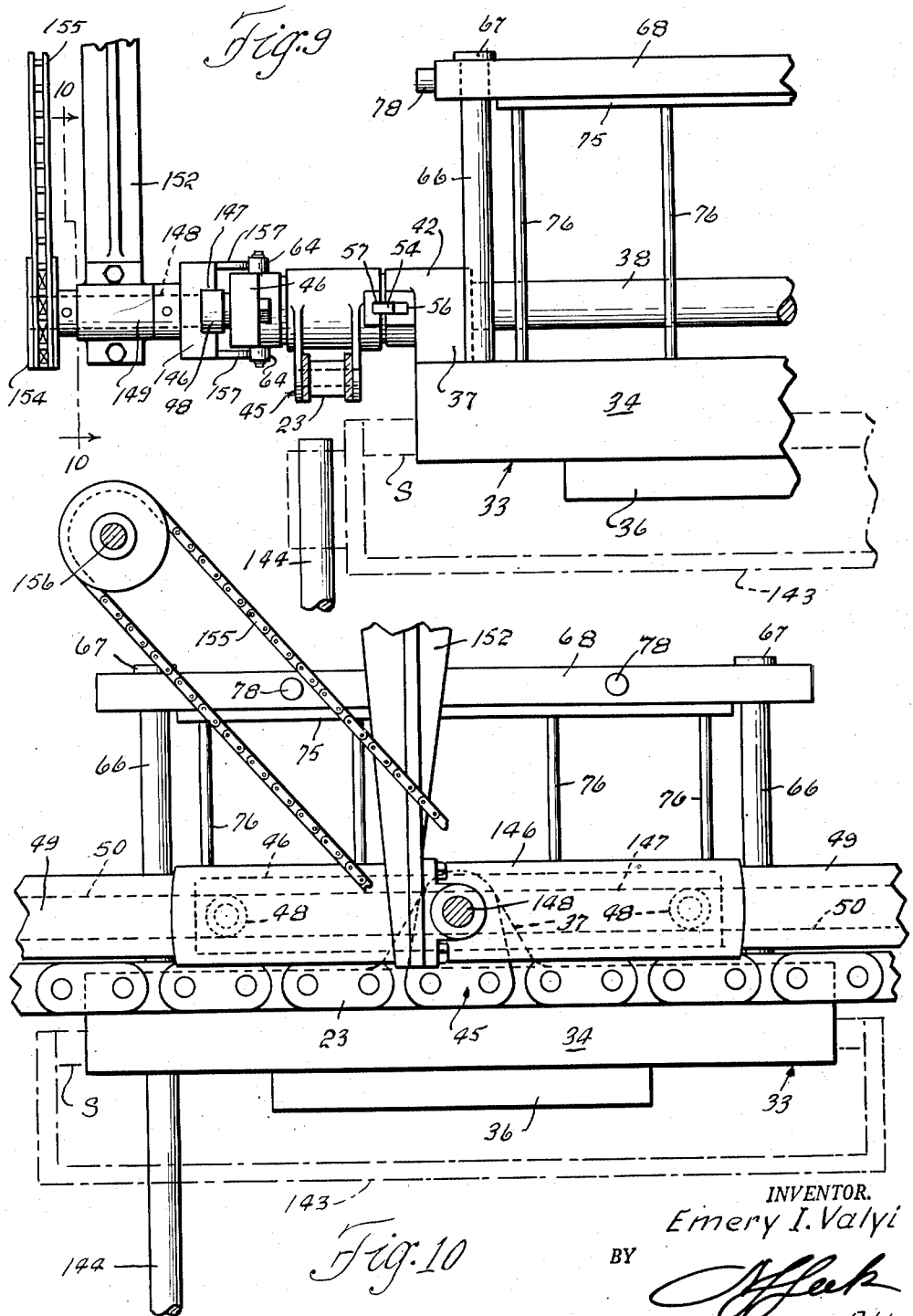

Patented Feb. 23, 1954

2,669,758

UNITED STATES PATENT OFFICE 2,669,758

MOLD FORMING MACHINE

Emery I. Valyi, Bronx, N. Y.

Application May 14, 1951, Serial No. 226,229

6 Claims. (Cl. 22—20)

This invention relates to a machine for producing foundry molds in shell form from a molding mixture comprising a refractory and a bonding agent.

The machine carries one or more permanent patterns and includes means for processing the patterns through a plurality of steps for forming the mold shell, curing the shell and stripping the cured shell from the pattern in sequence. More specifically the machine provides a plurality of pattern carriers disposed along an endless conveyor and arranged to be advanced step by step through a plurality of stations in which the necessary processing steps are performed in sequence.

In the embodiment shown the machine comprises a pattern treating station, a mold forming station, a mold curing station and a mold stripping station, and an endless conveyor carrying a series of pattern carriers and arranged to advance the carriers in succession through said stations in a repeated cycle. Each pattern carrier may include a set of ejector pins for stripping the completed shell therefrom.

The mold treating station includes means for applying a mold release solution to the pattern to facilitate stripping of the cured mold therefrom, and may include means for controlling the temperature of the pattern. In the case of metal patterns and heat setting binding agents the treating station may include means for preheating the pattern to a temperature suited to the formation of the mold shell.

The mold forming station includes means for applying a blanket of the molding mixture to the pattern and holding the mixture in contact with the pattern for a time selected to allow a layer or shell of partly cured mixture to be built up on the surface of the pattern. It also includes means to remove the excess mixture after the shell has been built up to the desired thickness. This may be done by draining the mixture or by inverting the pattern holder and dumping the mixture then restoring the carrier to upright position before advancing to the curing station.

The curing station includes heating means such as an oven for finishing the curing of the shell and the stripping station includes means to actuate the ejector pins of the pattern for stripping the cured mold shell therefrom.

The conveyor is shown as arranged in upper and lower flights and to invert the pattern carriers as they advance from one flight to the other. Additional inverting means are provided where necessary for righting the pattern carriers. In the form shown the mold forming station is disposed in part on the upper flight and in part on the lower flight to utilize the inversion of the carriers in passing from one flight to the other for dumping the excess molding mixture and means is provided for righting the pattern carrier before advancing to the curing station. The forming station may however be located entirely on one flight of the conveyor or at one location and means may be provided for inverting and righting the pattern carrier while on such flight or at such location. The other stations may be disposed on the two flights in different arrangements with provision for maintaining the pattern carriers upright while receiving the mixture and while in the curing zone but inverted for dumping the excess mixture. In the embodiment shown the carriers are inverted for stripping and for treatment with the release solution although these steps may be carried out with the pattern upright if desired.

When using a refractory bonding agent mixture comprising silica, alumina or zirconia sands or flours for the refractory, and phenol, melamine or urea formaldehyde resins or other organic or inorganic binding agents, and metal patterns, the patterns may first be treated with a mold release solution which prevents the molds from sticking to the patterns and then preheated to a temperature of from 350° to 600° F. The heated patterns are then covered with the molding mixture to a depth of several inches for five to twenty-five seconds during which time the heated pattern causes the mixture contacting the pattern to bond and solidify into a partly cured layer or shell having a uniform thickness of, for example, between one-eighth inch and one-quarter inch. The thickness of the shell depends on the time of contact of the mixture and the temperature of the pattern. The unbonded portion of the mixture is then removed from the pattern and the shell is then subjected to a curing temperature of, for example, between 500° F. and 900° F. The shell is subjected to the curing temperature until the shell is cured to a hard, rigid, strong condition. The cured mold is then stripped from the pattern after which the pattern is cleaned and the operation repeated.

The principal object of the invention is to provide an improved apparatus for producing automatically shell molds from a mixture of refractory and a suitable bonding agent.

Another object of the invention is to provide an apparatus of this character having a plurality of stations for performing simultaneously a plurality of different operations.

Another object of the invention is to provide an apparatus of the character described in which an endless conveyor having upper and lower flights is utilized to present successive mold patterns successively to a plurality of successively arranged stations.

Another object of the invention is to provide a machine of the character described which is of simple construction, is efficient in operation and is relatively inexpensive to manufacture.

Other and more specific objects of the invention will be apparent from the following specification and the accompanying drawings forming a part thereof wherein:

Fig. 3 is a transverse vertical section taken on the line 3—3 of Fig. 2;

Fig. 4 is a view in side elevation, partially broken away, looking from the left of Fig. 2;

Fig. 5 is an enlarged fragmentary detail section taken on the line 5—5 of Fig. 3;

Fig. 6 is an enlarged transverse fragmentary section taken on the line 6—6 of Fig. 1;

Fig. 9 is an enlarged transverse fragmentary view showing the pattern carrier turning mechanism at the treating and heating station, the plane of the view being indicated by the line 9—9 of Fig. 1; and Fig. 10 is a view in side elevation, looking from the left of Fig. 9 as indicated by the line 10—10 of Fig. 9.

Figure 1:
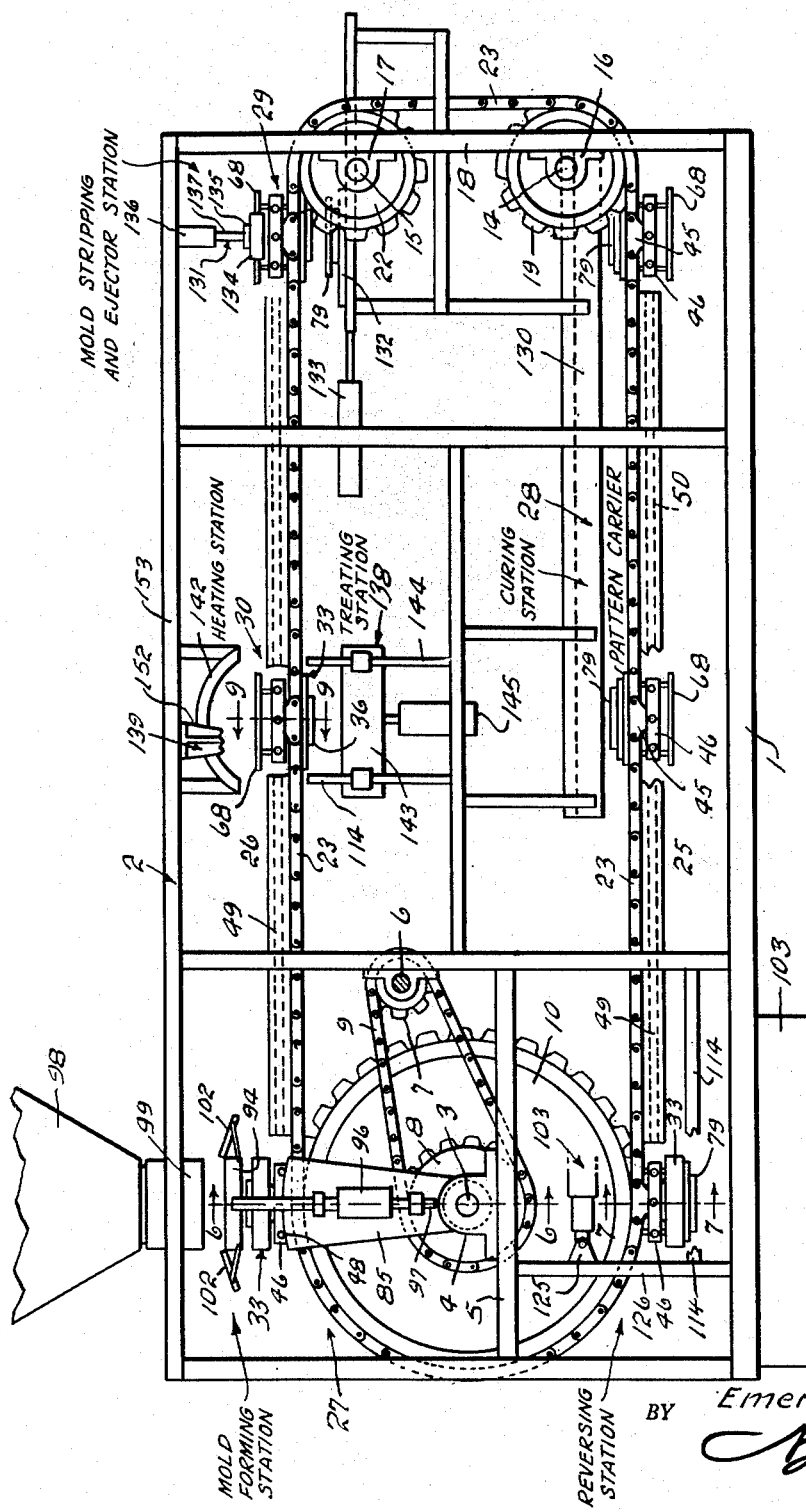
Fig. 1 is a schematic layout in side elevation of a machine embodying my invention.

Referring now to the drawings by reference characters, the numeral 1 indicates a base having a pair of spaced parallel side frames, generally indicated by the numeral 2, secured to and extending upwardly therefrom. A transverse shaft 3 is rotatably mounted adjacent the forward end of the machine in suitable bearings 4 secured to horizontal beams 5 of the side frames 2. The shaft 3 is intermittently driven in a counterclockwise direction through 180° by a transverse shaft 6 through sprockets 7 keyed to the shaft 6, sprockets 8 rotatably mounted on the shaft 3 and a pair of chains 9 each of which connects a sprocket 7 with a sprocket 8. Means to be described hereinafter are provided by which the gears 8 are alternately connected to and released from the shaft 3. Two spaced large sprockets 10 are tied together by a hub 11 which is keyed upon the shaft 3, as indicated at 11a, between the sprockets 8. The shaft 6 is rotatably mounted in suitable bearings 12 secured to vertical beams 13 of the frame 2, and is intermittently driven in first one direction and then in the opposite direction by a suitable motor and transmission, not shown. A pair of transverse vertically spaced idler shafts 14 and 15 are rotatably mounted in bearings 16 and 17 secured to the vertical frame beams 18 at the rear end of the machine. The shaft 14 has two spaced sprockets 19 keyed thereon, and the shaft 15 has two spaced sprockets 22 keyed thereon. An endless chain 23 is mounted upon one set of sprockets 10, 19 and 22, and a similar parallel chain 24 is mounted upon the other set of sprockets 10, 19 and 22. The chains 23 and 24 constitute an endless conveyor having a lower flight 25 and an upper flight 26. The chains 23 and 24 are intermittently driven in unison by the large sprocket 10, forwardly along the upper flight and rearwardly along the lower flight, a distance equal to one-half the pitch circumference of the gears 10.

The mold forming station, generally indicated by the numeral 27, is located at the forward end of the machine where the conveyor passes from the upper flight 26 to the lower flight 25. The curing station, generally indicated by the numeral 28, is located along the lower flight 25 of the conveyor between the sprockets 10 and 19. The stripping station, generally indicated by the numeral 29, is located along the top flight of the conveyor adjacent the rear end of the machine; and the treating and heating station 30 is located along the top flight of the conveyor midway between the stripping station 29 and the forming station 27. The various stations 27 to 30 are all spaced equally from each other a distance equal to the distance the conveyor is moved during each intermittent movement. Six equally spaced pattern carriers 33 are secured to the conveyor for movement therewith, the distance between the carriers also being equal to the distance the conveyor is moved during each intermittent movement thereof, which, as previously stated, is equal to one-half the pitch circumference of the sprockets 10. The conveyor is operative to present successively successive pattern carriers to the forming station 27, the curing station 28, the stripping station 29, and finally the treating and heating station, during each round trip of the conveyor which occurs every three complete revolutions of the shaft 3 and conveyor driving sprockets 10 keyed thereon.

Figure 2:
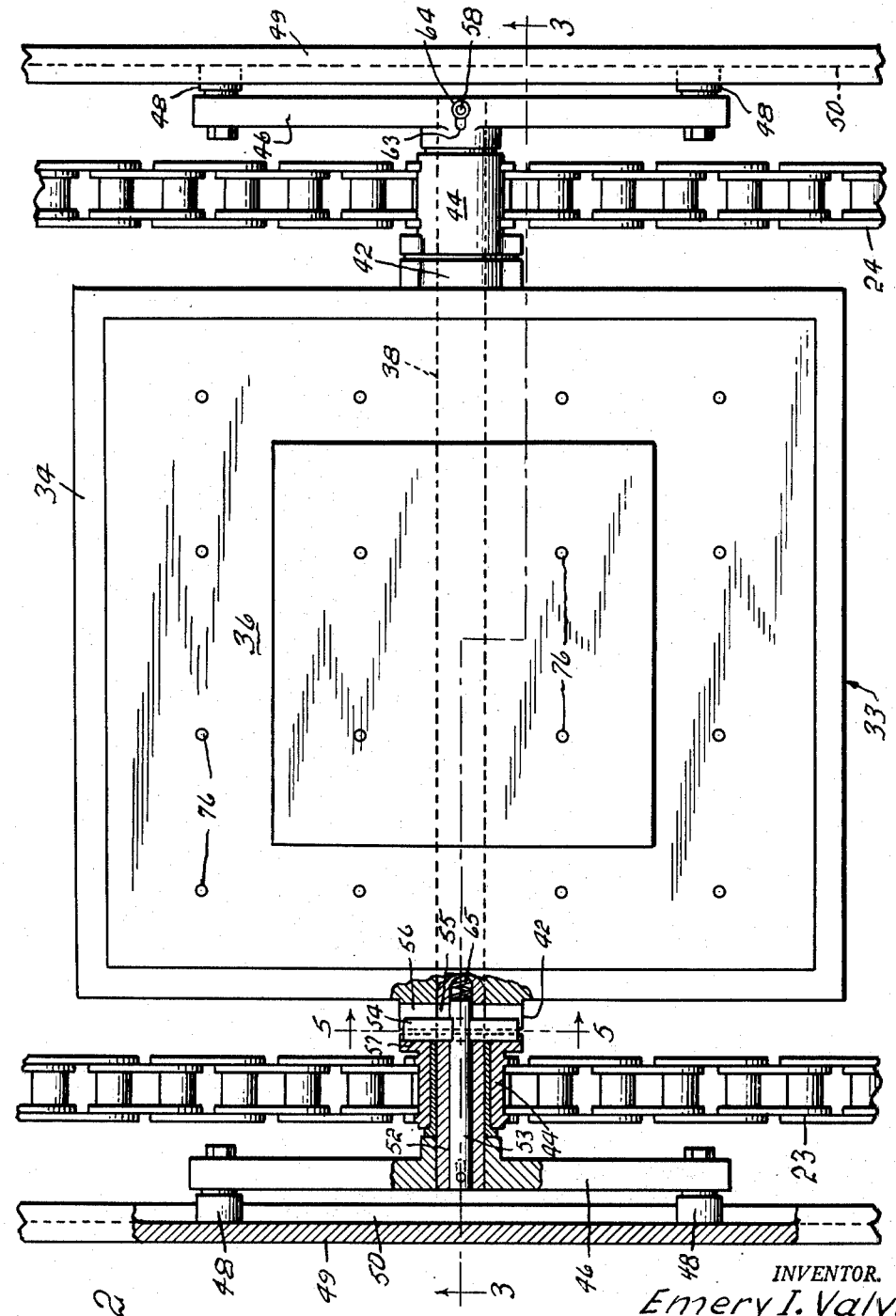
Fig. 2 is a plan view partially in section of one of the pattern carriers, showing it secured to and between a pair of spaced endless chains which constitute an endless conveyor, the plane of the view being indicated by the line 2—2 of Fig. 3.
Figures 7, 8:
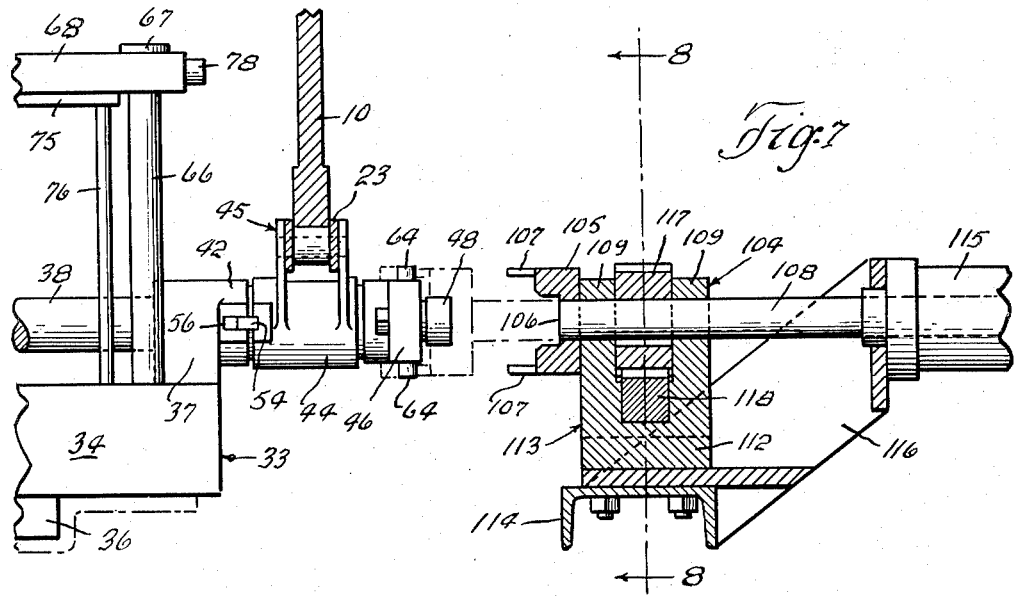
Fig. 7 is an enlarged transverse fragmentary section through the pattern carrier turning mechanism at the forming station, the plane of the section being indicated by the line 7—7 of Fig. 1.
Fig. 8 is a longitudinal section taken on the line 8—8 of Fig. 7.

Each pattern carrier 33 comprises a rectangular frame 34 having an inturned annular flange 35 around the lower edge thereof. A thick heavy metal pattern 36 is removably secured within the frame 34 upon the inturned flange 35 by any suitable means, not shown. The frame 34 has a pair of shaft hangers 37 formed integral therewith and extending downwardly therefrom, one at each side midway between forward and rear ends thereof. A transverse shaft 38 is rigidly secured in bores 39 in the hubs 42 of the hangers 37 by pins 43. The shaft 38 is rotatably mounted in the hubs 44 of a pair of opposed trunnion links 45, one of which is interposed in each of the chains 23 and 24 in place of one of the standard chain links. A rocker arm 46 is keyed to each end of the shaft 38 adjacent the trunnion links 44, as indicated at 47. Each of the rocker arms 46 carries a pair of rollers 48, one at each end thereof, which are adapted to ride in grooves 50 in channel-shaped guide rails 49 which are mounted upon the side frame 2 along the upper and lower flights of the chains 23 and 24. Each end of the shaft 38 has an inwardly extending axial bore 52 therein in which is slidably mounted a rod 53 which carries a locking bar 54 at the inner end thereof. The locking bar 54 extends out through elongated slots 55 in the shaft 38 and into opposed slots 56 and 57 in the hanger hubs 42 and the trunnion link hubs 44, respectively. As shown in Figs. 2 and 3, the depth (front to back) of the slots 56 in the hanger hub 42 is at least equal to the width of the locking bars 54 and is substantially greater than the depth of the slots 57 in the link hubs 44, so that the locking bars 54 may be entirely withdrawn from the slots 57 into the slots 56, but cannot be entirely withdrawn from the slots 56 into the slots 57. Thus when the locking bars 54 are disposed in both the slots 56 and 57 as shown in Figs. 2 and 3, the shaft 38 and the frame 34 carried thereby are locked against rotary movement with respect to the trunnion links 45; and when the locking bars 54 are withdrawn from the slots 57 into the slots 56, the shaft may be rotated in the trunnion links 45 for the rocker arm 46 to shift the frame 34 from upright to inverted position, or vice versa, as and for the purpose hereinafter described. The rods 53 carry small rods 58 adjacent the outer end thereof which extend out through elongated vertically aligned slots 62 and 63 in the shaft 38 and the rocker arms 46, respectively. A small roller 64 is mounted on each end of the rods 58. Springs 65 in the bores 52 behind the rods 53 urge the rods 53 outwardly and the locking bars 54 into locking position in the slots 57. The locking bars 54 are moved into the slots 56 out of locking position by moving the small rods 58, and through them the rods 53 inwardly against the outward pressure of the springs 65.

A plurality of rods 66 having heads 67 on the lower ends thereof are secured to the underside of the frame 34 and extend downwardly therefrom, one at each corner thereof. An ejector plate 68 is slidably mounted upon the rods 66. In normal upright position of the pattern carrier 33, the plate 68 rests upon the heads 67 of the rods 66 and is yieldingly held thereagainst by balls 69 in horizontal bores 72 in the plate 68, which are urged into engagement with tapered notches 73 in the rods 66 by springs 74. A plate 75, carrying a plurality of stripping pins 76, is removably secured to the ejector plate 68. The stripping pins 76 extend upwardly from the plate 75 through bores 77 in the pattern 36 with the upper ends thereof normally terminating flush with the upper surface of the pattern 36. The ejector plate 68 has two spaced, outwardly extending cylindrical bosses 78 secured to each side thereof. At the stripping station the stripping mechanism engages the bosses 78 and moves the ejector plate toward the frame 34. The movement of the plate 68 projects the stripping pins 76 out through the bores 77 which strips the mold shell 79, shown in dot and dash lines in Figs. 2 and 3, from the pattern, as is explained in detail hereinafter.

At the top of the mold forming station 27 a mechanism is provided by which an excess quantity of a dry mixture of fine sand and a suitable bonding agent is applied over the face of a heated pattern 36. This mixture is maintained over the pattern a sufficient time for the mixture contacting the pattern face to be solidified by the heat of the pattern into a thin partially cured mold shell 79. During this time the pattern carrier 33 and associated parts are transferred from the top part of the station 27 adjacent the upper flight 26 of the conveyor to the bottom of the station adjacent the lower flight 25 of the carrier where the excess unbonded portion of the mixture is removed from the face of the pattern. As the pattern carrier travels from the top of the station to the bottom of the station it is inverted. Consequently a mechanism is provided at the bottom of the station by which the mold carrier is returned to upright position.

Referring now to Figs. 1, 6, 7 and 8 of the drawings in which the forming station mechanism is illustrated, the sprockets 8 through which the main shaft 3 is intermittently rotated, are formed with hubs 82 which are provided with bushings 83 and are rotatably mounted upon the shaft 3. The hubs 82 have reduced cylindrical extensions formed integrally therewith at one side thereof on which are keyed segments 85, as shown at 86. An arcuate track 90, onto which the rollers 48 carried by the rocker arms 46 ride as they leave the upper guide rails 49, are secured to the inner face of each of the segments 88 at the upper ends thereof. A collar 87 having aligned bores 88 is keyed to the shaft 3, as indicated at 89, adjacent each hub extension 84. A guide 92 in which a slide 93 is slidably mounted is secured to the outer face of each of the segments 85 adjacent the upper ends thereof. An open ended rectangular skirt 94 having the same internal dimensions as the pattern carrier frame 34 is secured to and between the slides 93, for up and down movement therewith, by brackets 95. A pair of pneumatic cylinders and piston assemblies 96 which are mounted upon the segments 85 below the guides 92 are provided to raise and lower the slides 93 and with them the skirt 94. The cylinders and piston assemblies 96 are operatively connected to the slides 93 by connecting rods 97 which extend above and below the cylinders 96. The connecting rods 97 below the cylinder and piston assemblies 96 are slidably mounted in a bore 100 in guide block 111 secured to and projecting outwardly from the segments 85. As the cylinder and piston assembly 96 operate to bring the skirt 94 down against a pattern carrier frame 34 around a pattern 36 therein, they simultaneously project the lower ends of the connecting rods 97 into one of the bores 88 in the collars 87 and lock the segments 85 to the shaft 3, which through the segments 85 and keys 86 also locks the sprockets 8 to the shaft 3. After the skirt 94 has been brought down into engagement with a frame 34 around a pattern 36 therein and the segments 85 and sprockets 8 have been locked to the shaft 3 by the action of the cylinder and piston assembly 96 and connecting rods 97, a measured quantity of the dry mixture of sand and bonding agent is withdrawn from a storage hopper 98 and deposited in the skirt 94 over the face of the surrounded pattern 36 by suitable means 99. The covers 102 (shown in dot and dash lines in Fig. 6) are then automatically placed over the skirt 94, after which the sprockets 8 are rotated through 180° by the shaft 6 through the sprockets 7 and chains 9. The sprockets 8 in turn rotate the shaft 3 and the large conveyor drive sprockets keyed thereto, and the segments 85 keyed to the hubs of the sprockets 8, through 180° likewise. This advances the endless chain conveyor 23—24 and the pattern carrier 33 secured thereto a distance equal to one-half the pitch circumference of the sprockets 10, and at the same time transfers the covered skirt 94 along with the pattern carrier thereunder from the top of the machine to the bottom of the machine, during which movement the skirt 94 and the associated pattern carrier are inverted. At the bottom of the machine the covers 102 are automatically removed from the skirt, and the excess mixture of sand and bonding agent is dumped from the skirt 94, into any suitable receptacle 103 from which it is afterwards returned to the hopper 98, leaving a partially cured mold shell 79 adhering to the pattern. The cylinder 96 is then actuated to remove the skirt 94 from the associated mold carrier 33 and to remove the rods 97 from the bores 88 in the collars 87 which releases the sprockets 8 from the shaft 3 so that they are free to rotate thereon. The sprockets 8 are then rotated in a clockwise direction by the shaft 6 to return the segments 85 and the skirt 94 to their original position at the top of the machine with the skirt 94 over another pattern carrier which was advanced into position as the preceding mold carrier was transferred from the top of the machine to the bottom thereof. After the segments 85 and the skirt 94 have been returned to their original position, the pattern carrier 34, under the shaft 3, and the partially cured mold shell 79 adhering to the pattern are returned to upright position by a turning mechanism generally indicated by the numeral 104.

The turning mechanism 104, which is duplicated on each side of the machine, comprises a reversing bar 105 having a channel groove 106 extending from end to end in the inner face thereof, and a pair of cams 107 extending inwardly from the upper and lower edges thereof. The bar 105 is rigidly secured to the end of a shaft 108 which is slidably and rotatably mounted in two spaced parallel hanger arms 109 which extend upwardly from the base 112 of a shaft hanger 113 which is mounted on a beam 114 of one of the side frames 2. The other end of the shaft 108 is secured to a piston (not shown) in a cylinder 115 which is carried by a bracket 116 secured to and extending outwardly from the beam 114. A pinion gear 117 is slidably keyed upon the shaft 108 between the hanger arms 109. The base 112 of the hanger 113 has a longitudinal guideway therein in which a rack 118 is slidably mounted in mesh with the pinion 117. The rear end of the rack 118 is connected by a rod 119 to the lower end of a pivoted lever 122, the upper end of which is connected to the outer end of a connecting rod 123 of a cylinder and piston assembly 124. The cylinder and piston assembly 124 is pivotally secured to a bracket 125 mounted upon a vertical beam 126 of the side frame 2. After the segments 85 and the skirt 94 have been returned to their original position at the top of the machine, the shaft 108 is moved outwardly from the cylinder 115 by the piston therein to shift the reversing bar 105 from the position shown in full lines to the position shown in dot and dash lines in Fig. 7 where the rollers 48 carried by the rocker arms 46 of the mold carrier 33 are disposed in the channel slot 106. As the reversing bar 105 approaches the rocker 46 of the pattern carrier 33, the cams 126 engage the rollers 64 on ends of the rods 58 and move them and the rods 52 inwardly against the resistance of the springs 65. The inward movement of the rods 52 withdraws the locking bars 54 from the slots 57 into the slots 56, thereby unlocking the pattern carrier shaft 38 so that it is free to turn in the trunnion links 45. The rack 118 then actuates the cylinder and piston assembly 124 through the pivotal lever 122 to rotate the pinion gear 117, shaft 108 and reversing bar 105 through 180° which returns the pattern carrier to upright position. The next forward movement of the chain conveyor 23—24 advances the pattern carrier and partly cured mold shell 79 thereon to the curing station 28.

The curing station 28 is disposed along the lower flight 25 of the conveyor. At this station an oven 130 is suitably supported between the side frames 2 over the conveyor 23—24 in position to heat and cure the mold shells 79 as they are advanced thereunder by the intermittent movement of the conveyor.

After leaving the oven 130 the pattern carriers 33 and the patterns 36 and mold shells 79 thereon are moved upwardly around the sprockets 19 and 22 and then forwardly along the upper flight 26 of the conveyor a short distance to the stripping station 29. During this movement the pattern carriers are again reversed so that the patterns 36 and the mold shells thereon are facing downwardly when the carriers 33 reach the stripping station 29. At the stripping station 29 the mold shells 79 are stripped from the patterns 36, by a stripping mechanism 131, and deposited upon a reciprocal carriage 132 which discharges the mold shells from the machine. The carriage 132 is actuated by suitable mechanism which includes a cylinder and piston assembly 133.

The stripping mechanism 131 as schematically illustrated herein, includes a pair of spaced vertically reciprocal bars 134 which are secured to a transverse beam 135. The beam 135 and the bars 134 are raised and lowered by a cylinder and piston assembly 136 through a connecting rod 137 having the lower end thereof secured to the beam 135. The reciprocal bars 134 have a pair of opposed inwardly facing slots into which the cylindrical bosses 78 on the ejector plates 68 extend when the carriers 33 are in position under the stripping mechanism 131. After the carriers have come to rest with the bosses 78 in the opposed slots of the reciprocal bars 134 the cylinder and piston assembly 136 is actuated to move the bars 134 downwardly. This depresses the ejector plate 68 and the pins 76 which strips the mold shells 79 from the patterns 36 onto the discharge carriage 132.

The stripping mechanism 131 and the discharge carriage 132 are shown in detail and claimed in my co-pending application, Serial No. 232,505, filed June 20, 1951.

After the mold shells 79 have been stripped from the patterns 36 at the stripping station 29, the carriages 33 are advanced, while still in inverted position, to the treating and heating station 30 by the next intermittent movement of the conveyor.

At the treating and heating station 30 a mold release solution is applied to the faces of the patterns 36 by a treating mechanism 138 after which the carriers 33 are turned back to upright position, by reversing mechanism 133, and the patterns 36 preheated by an oven 142.

The treating mechanism 138 is disposed below the upper flight 125 of the conveyor and comprises a rectangular tank 143 which is slidably mounted for up and down movement upon a plurality of vertical rods 144. The tank 143 is raised and lowered upon the rods 144 between the position shown in Fig. 1 and the position shown in dot and dash lines in Figs. 9 and 10 by a cylinder and piston assembly 145. The tank 143 is filled with the mold release solution up to the line 3 in Figs. 9 and 10. After the carriers come to rest at the treating and heating station 30, the cylinder and piston assembly 145 is actuated to raise the tank up to the position shown in dot and dash lines in Figs. 9 and 10. In this position the face of a pattern 36 is immersed in the mold release solution and is thoroughly coated therewith. The tank 143 is then lowered and the carrier turned to upright position, under the oven 142, by the reversing mechanism 139.

The reversing mechanism 139 is duplicated at each of the machines, and each comprises a turning bar 146, having a longitudinal groove 147 therein, which is interposed in a rail 49 with the groove 147 in register with the groove 50 in the rail 49. The turning bar 146 is rigidly secured to the inner end of a short shaft 148 which is rotatably mounted in a suitable bearing 149 which is secured to the lower end of a hanger 152 depending from the top beam 153 of the side frame 2. The outer end of the shaft 148 has a sprocket 154 keyed thereon through which the shaft 148 is rotated by a chain 155 driven by a shaft 156. As the pattern carriers 33 approach the at rest position at the station 30 with the shaft 38 in axial alignment with the shafts 148, the rollers 48 carried by the rocker arms 46 of the pattern carriers ride from the grooves 50 in the rails 49 into the grooves 147 in the turning bars 146. Inwardly extending cams 157 secured to the upper and lower edges of the turning bar 146 in vertical alignment with the axis of the shaft 148, engage the rollers 64 and press the rods 58 and 53 inwardly against the resistance of the springs 65 which withdraws the locking bars 54 from the slots 57 into the slots 56 and unlatches the shaft 38 from the trunnion links 45 so that the shaft 38 is free to turn with respect to the trunnion links 45. The shaft 148 and the turning bar 146 are then rotated by and from the shaft 156 through 180° which brings the pattern back to upright position as shown in Fig. 3. After the pattern 36 has been preheated by the oven 142, the pattern carrier is moved back again to the mold forming station by the next intermittent movement of the conveyor, in position to start the next cycle.

In operation the pattern carriers 33 carrying patterns 36 are successively presented to the stations 27 to 30 by the intermittent movement of the conveyor 23—24. During the interval between movements of the conveyor the pattern carriers remain stationary during the various operations performed at the different stations. As one pattern carrier leaves a station the next succeeding carrier is advanced thereto. At the top of the forming station an excess mixture of fine sand and a bonding agent is applied to the faces of successive patterns 36 and is maintained thereagainst a sufficient time for that portion of the mixture in contact with the pattern to bond and solidify into a partially cured thin mold shell 79. The next advancement of the conveyor transfers the pattern carrier 33 and the mixture of sand and bonding agent from the top of the forming station along the upper flight 26 of the conveyor to the bottom of the station along the lower flight 25 of the conveyor, where the excess unbonded portion of the mixture is dumped from the pattern, leaving the partially cured mold shell on the pattern. As the pattern carrier 33 is transferred from the top to the bottom of the forming station 30, it is inverted so that the pattern 36 and the mold shell 79 thereon are facing downwardly when the carrier reaches the bottom of the station. After the excess mixture of sand and bonding agent has been dumped from the pattern, the carrier 33 and the pattern 36 and mold shell 79 carried thereby are returned to upright position by the reversing mechanism 104. The next advancement of the conveyor brings the carrier and mold shell 79 carried thereby under the oven 130 at the curing station. As the carrier is moved along under the oven 130 the curing of the mold shell 79 is completed. After leaving the oven 130 the carrier 33 is advanced to the stripping station 29. During the movement of the carrier from the curing station to the stripping station, the carrier is again inverted so that the pattern 36 and mold shell 79 are presented to the stripping mechanism 131 in inverted position. At the stripping station the mold shell 79 is stripped from the pattern by the mechanism 131 and discharged from the machine by the discharge conveyor 132. From the stripping station 29 the carrier, in inverted position, is advanced to the treating and heating station 30 where the face of the pattern is coated with a film of mold release solution by the mechanism 138. The carrier is then returned to upright position under the oven 142, by the reversing mechanism 139, in position for the oven 142 to preheat the pattern 36 to the temperature desired. From the treating and heating station 30 the carrier is returned to the mold forming station 27 for the beginning of the next cycle of movement and operation.

From the foregoing it will be apparent to those skilled in this art that I have provided a very efficient and relatively simple machine for producing continuously mold shells from a mixture of fine molding sand and a suitable bonding agent.

It is to be understood that I am not limited to the specific construction shown and described as various modifications may be made therein within the spirit of the invention. For example, the rocker arms may be permanently attached to the carriers and the assembly may be mounted to pivot freely on the conveyor, being normally held against pivoting by the guide rails. In this form a portion of the guide rail at the reversing position may be mounted for rotation so that the guide rail and carrier are reversed as a unit. Other modifications may be made as will be apparent to a person skilled in the art.

What is claimed is:

1. A machine of the character described comprising a plurality of stations including a mold forming station, a mold curing station and a mold stripping station, an endless conveyor having upper and lower flights, at least one of said stations being located along each flight of said conveyor, a plurality of spaced pattern carriers secured to said conveyor, mold patterns mounted upon said pattern carriers, means by which said conveyor is intermittently advanced a predetermined distance, said conveyor being operative successively to present successive pattern carriers successively to said forming station, said curing station and said stripping station, said pattern carriers being inverted as they advance along said conveyor from one flight to the other flight of said conveyor, means at said forming station operative to form a partially cured mold shell over the face of said patterns, means at said curing station operative to complete the curing of said mold shells, means at said stripping station operative to strip said mold shells from said patterns, and a separate reversing mechanism along each flight of said conveyor operative to return said pattern carriers to upright position.

2. A machine of the character described comprising a plurality of stations including a mold forming station, a mold curing station and a mold stripping station, an endless conveyor having upper and lower flights, at least one of said stations being located along each flight of said conveyor, a plurality of spaced pattern carriers rotatably secured to said conveyor, holding means operative to secure said pattern carriers against rotation with respect to said conveyor, mold patterns mounted upon said pattern carriers, an ejector plate having a plurality of ejector pins secured thereto slidably mounted upon each of said pattern carriers, means by which said conveyor is intermittently advanced a predetermined distance, said conveyor being operative successively to present successive pattern carriers successively to said mold forming station, said curing station and said stripping station, said pattern carriers being inverted as they advance along with said conveyor from one flight to the other flight of said conveyor, means at said mold forming station operative to form a partially cured mold shell over the face of said patterns, means at said curing station operative to complete the curing of said mold shells, means at said stripping station operative to actuate said ejector plate and the pins secured thereto to strip said mold shells from said patterns, and a separate reversing mechanism along at least one flight of said conveyor operative to actuate said holding means to rotate said pattern carriers.

3. A machine of the character described comprising a plurality of stations including a mold forming station having upper and lower sections, a mold curing station and a mold stripping station, an endless conveyor having upper and lower flights, said forming station being located in part on the upper flight and in part on the lower flight of said conveyor, a plurality of spaced pattern carriers secured to said conveyor, mold patterns mounted upon said pattern carriers, means by which said conveyor is intermittently advanced a predetermined distance, said conveyor being operative successively to present successive mold carriers successively to the upper part of said forming station, the lower part of said forming station, said curing station and said stripping station, means by which each pattern is preheated prior to its delivery to said forming station, means operative to apply an excess amount of a molding mixture over the face of said preheated pattern at the upper part of said forming station, means by which said molding mixture is maintained against said pattern face as the pattern carriers are advanced from the upper part to the lower part of said forming station until the contacting portion of said mixture forms a thin mold shell, means operative to remove the unbonded portion of said mixture from said pattern at the lower part of said forming station, means at said curing station operative to complete the curing of said mold shell, and means at said stripping station operative to strip said mold shell from said pattern.

4. A machine of the character described comprising a plurality of stations including a mold forming station having upper and lower sections, a mold curing station and a mold stripping station, an endless conveyor having upper and lower flights, said curing station being located along the lower flight of said conveyor, said stripping station being located along the upper flight of said conveyor, and said forming station being located in part on the upper flight and in part on the lower flight of said conveyor, a plurality of equally spaced pattern carriers secured to said conveyor, mold patterns mounted upon said pattern carriers, means by which said conveyor is intermittently advanced a predetermined distance, said conveyor being operative successively to present successive mold carriers successively to the upper part of said forming station, the lower part of said forming station, said curing station and said stripping station, means by which each pattern is preheated prior to its delivery to said forming station, means operative to apply an excess amount of a molding mixture over the face of said preheated pattern at the upper part of said forming station, means by which said molding mixture is maintained against said pattern face as the pattern carriers are advanced from the upper part to the lower part of said forming station until the contacting portion of said mixture forms a thin mold shell, means operative to remove the unbonded portion of said mixture from said pattern at the lower part of said forming station, means at said curing station operative to complete the curing of said mold shell, and means at said stripping station operative to strip said mold shell from said pattern.

5. A machine of the character described comprising a plurality of stations including a mold forming station having upper and lower sections, a mold curing station and a mold stripping station, an endless conveyor having upper and lower flights, said forming station being located in part on the upper flight and in part on the lower flight of said conveyor, a plurality of equally spaced pattern carriers rotatably secured to said conveyor, holding means by which said pattern carriers are secured against rotation with respect to said conveyor, patterns mounted on said pattern carriers, an ejector plate having a plurality of ejecting pins secured thereto slidably mounted on each of said pattern carriers, means by which said conveyor is intermittently advanced a predetermined distance, said conveyor being operative successively to present successive pattern carriers successively to said upper part of said forming station, said lower part of said forming station, said curing station and said stripping station, said pattern carriers being inverted as they are advanced from the upper part of said forming station to the lower part thereof by said conveyor, said pattern carriers being again inverted as they are advanced from said curing section to the stripping station, means by which each pattern is heated prior to its delivery to said forming station, means operative to apply an excess quantity of a molding mixture to the face of said pattern at the upper part of said forming station, means by which said molding mixture is maintained against said pattern until the contacting portion of said mixture forms a thin mold shell, means operative to remove the unbonded portion of said mixture from said patterns at the lower part of said forming station, reversing mechanism at the lower part of said forming station operative to actuate said holding means to release and rotate said pattern carrier from inverted to upright position, means at said curing station operative to complete the curing of said mold shells, means at said stripping station operative to actuate said ejector plate and said pins carried thereby to strip said mold shells from said patterns while said pattern carriers are in inverted position, and reversing means between said stripping station and said forming station operative to actuate said holding means to release and rotate said pattern carriers from inverted position to upright position.

6. A machine of the character described comprising an endless conveyor having upper and lower flights, a mold forming station, a mold curing station, a mold stripping station, a pattern treating station between said stripping station and said forming station, a plurality of equally spaced pattern carriers secured to said conveyor, mold patterns mounted upon said pattern carriers, means by which said conveyor is intermittently advanced, said conveyor being operative to present successive pattern carriers successively to said treating station, said forming station, said curing station and said stripping station, a supporting track adjacent the upper and lower flights of said conveyor on which said pattern carriers ride as they are advanced by said conveyor, said pattern carriers being inverted as they advance from one flight to the other flight of said conveyor, mechanism at said treating station operative to apply a mold release solution to the face of said pattern and to preheat said pattern, means at said forming station operative to form a partially cured mold shell over the face of said pattern, means at said curing station operative to complete the curing of said mold shell, and means at said stripping station operative to strip said mold shells from said patterns.

EMERY I. VALYI.

References Cited in the file of this patent

UNITED STATES PATENTS

| Number | Name | Date |
|---|---|---|
| 301,471 | Aregood | July 8, 1884 |
| 1,084,048 | Thiemann | Jan. 13, 1914 |
| 1,108,694 | Burkhardt | Aug. 25, 1914 |
| 1,127,113 | Thiemann | Feb. 2, 1915 |
| 2,317,574 | Williams | Apr. 27, 1943 |
| 2,355,722 | Goebel et al. | Aug. 15, 1944 |
| 2,570,717 | Ronceray | Oct. 9, 1951 |
| 2,570,927 | Fellows et al. | Oct. 9, 1951 |
| 2,612,668 | Hutchison | Oct. 7, 1952 |

OTHER REFERENCES

The Foundry, August 1950, pages 92–96, 206–217.